(No Model.)  7 Sheets—Sheet 1.

A. URBAN.
MACHINE FOR MAKING NUTS.

No. 517,779.  Patented Apr. 3, 1894.

Witnesses:
John C. Wilson
Percy C. Bowen

Inventor:
Anton Urban
By Whitman & Wilkinson
Attorneys.

Figure 1:
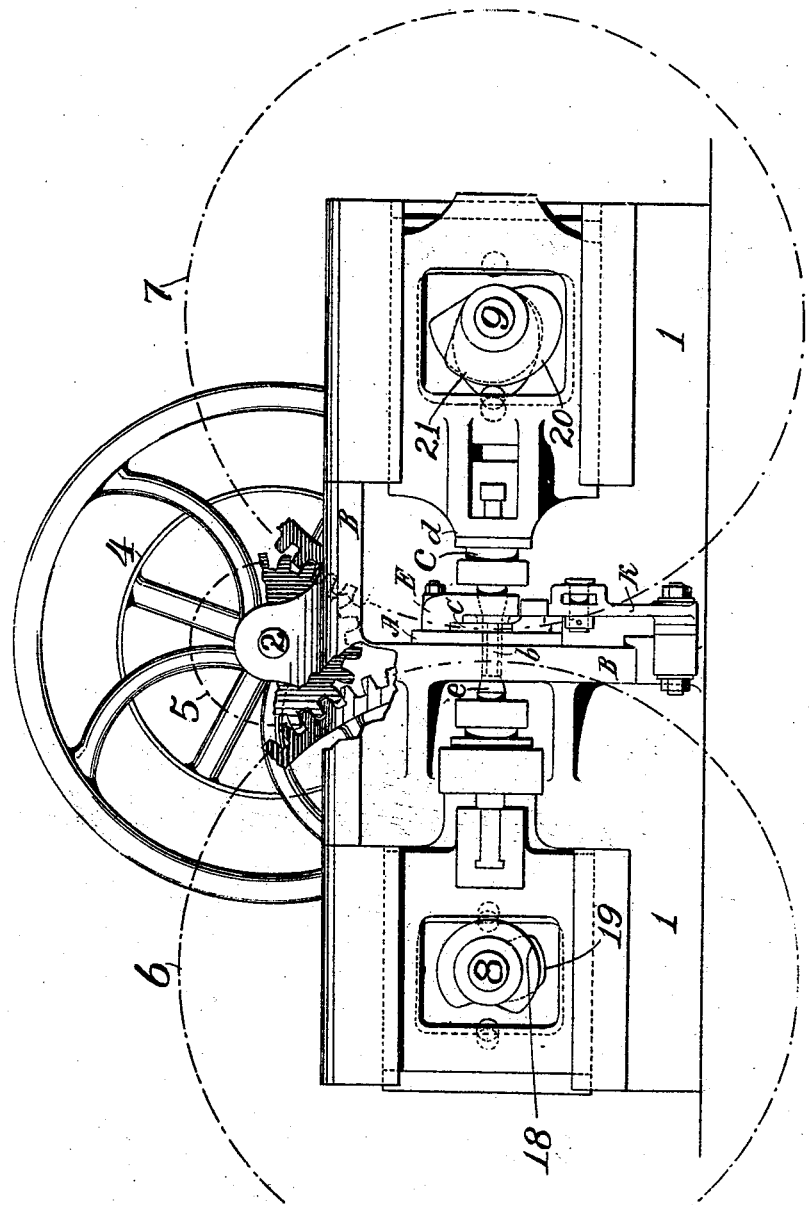

(No Model.)　　　　　　　　　　　　　　　　7 Sheets—Sheet 2.
A. URBAN.
MACHINE FOR MAKING NUTS.
No. 517,779.　　　　　　　　　Patented Apr. 3, 1894.
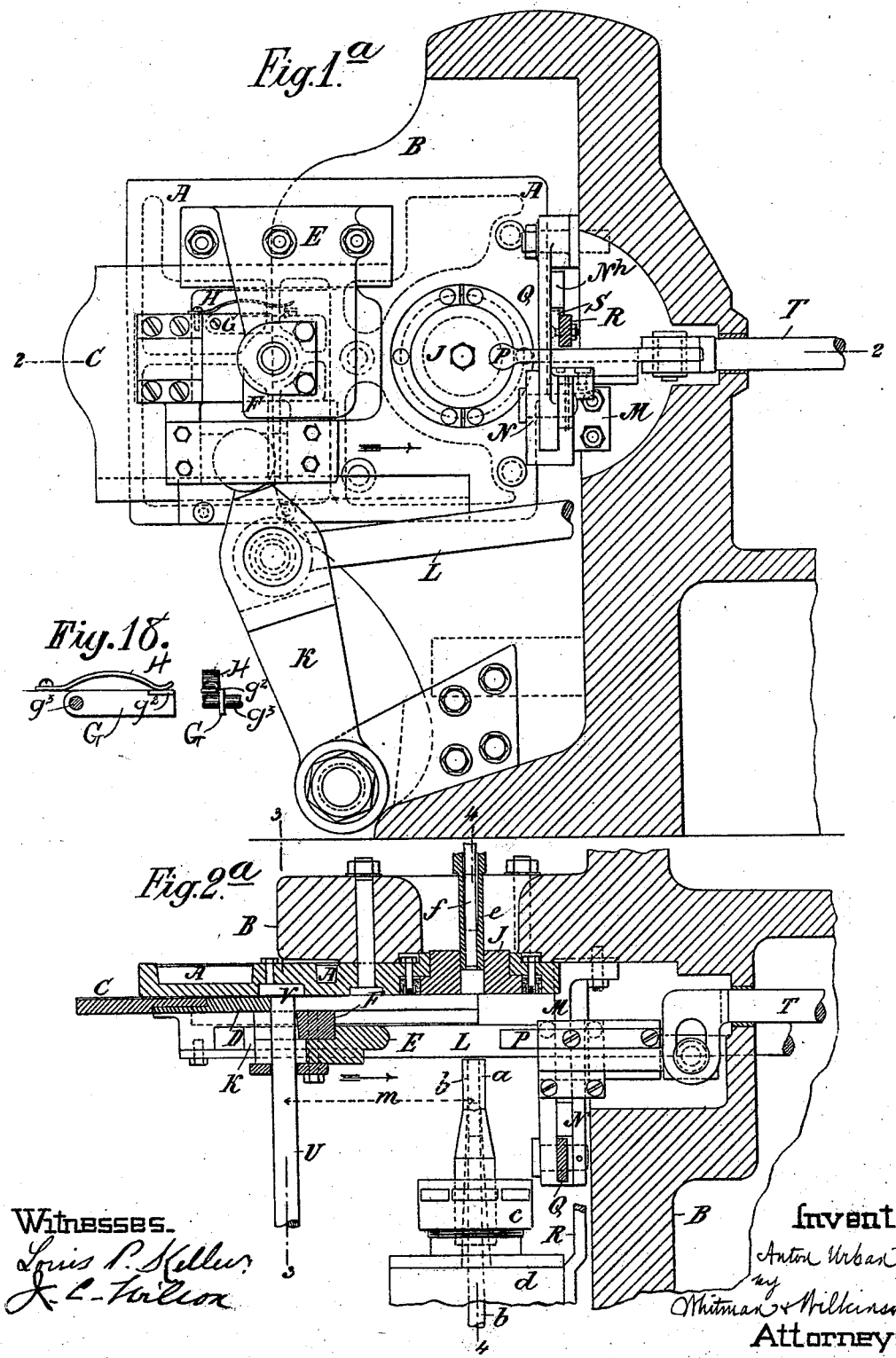
Witnesses.
Louis P. Keller
J. C. Villox
Inventor.
Anton Urban,
by
Whitman & Wilkinson
Attorneys (No Model.)  7 Sheets—Sheet 3.
A. URBAN.
MACHINE FOR MAKING NUTS.
No. 517,779.  Patented Apr. 3, 1894.
Fig. 1ᵇ
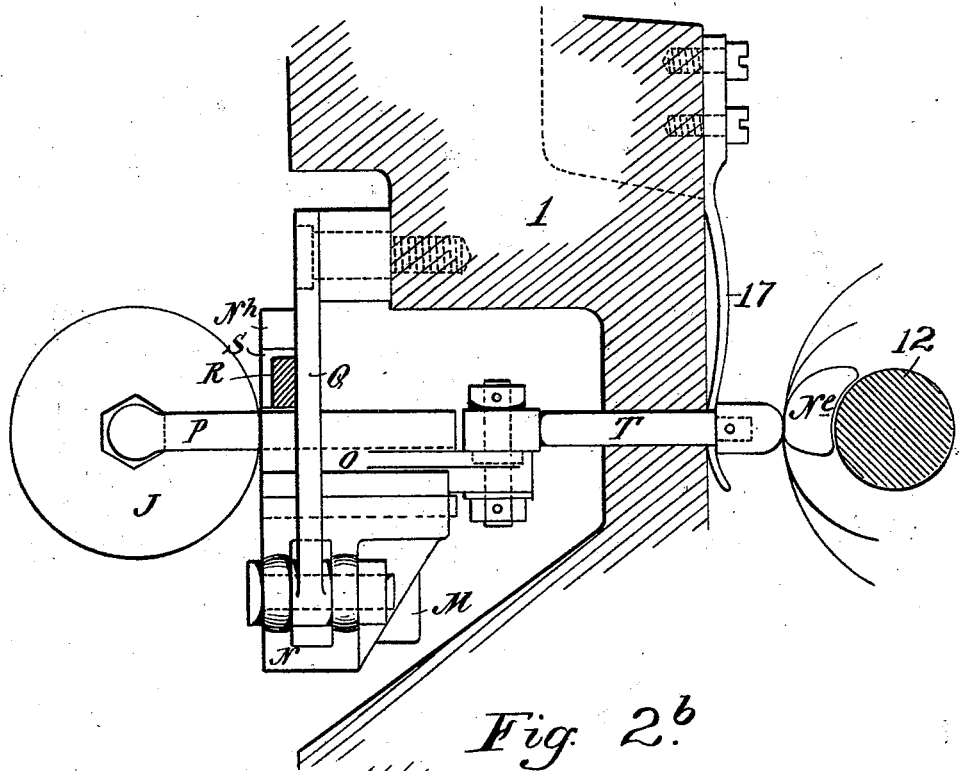
Fig. 2ᵇ
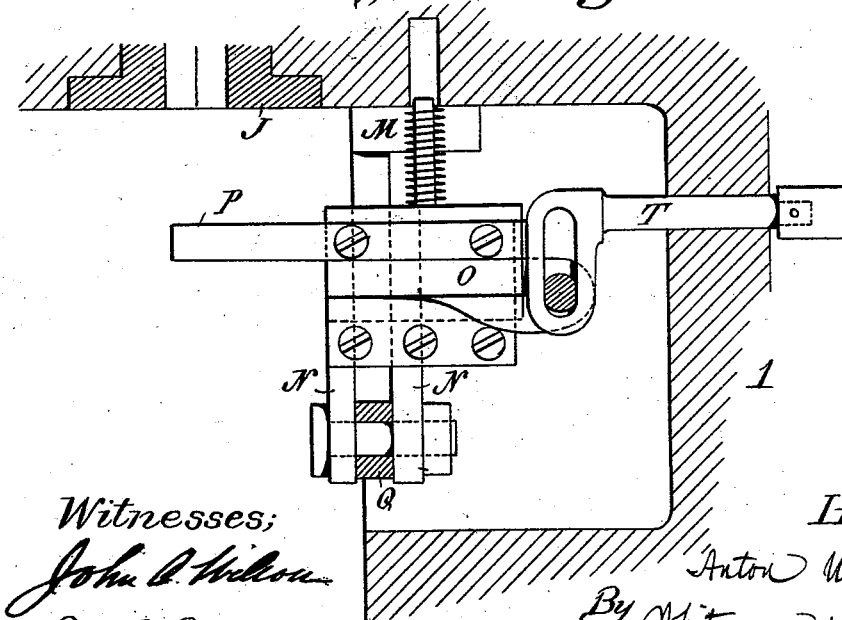
Witnesses:
John C. Wilson
Riley C. Bowen
Inventor:
Anton Urban
By Whitman & Wilkinson
Attorneys.

(No Model.) 7 Sheets—Sheet 4.

A. URBAN.
MACHINE FOR MAKING NUTS.

No. 517,779. Patented Apr. 3, 1894.

Witnesses:
John C. Whelan
Percy C. Bowen

Inventor:
Anton Urban,
By Whitman & Wilkinson,
Attorneys.

(No Model.) 7 Sheets—Sheet 5.
A. URBAN.
MACHINE FOR MAKING NUTS.
No. 517,779. Patented Apr. 3, 1894.
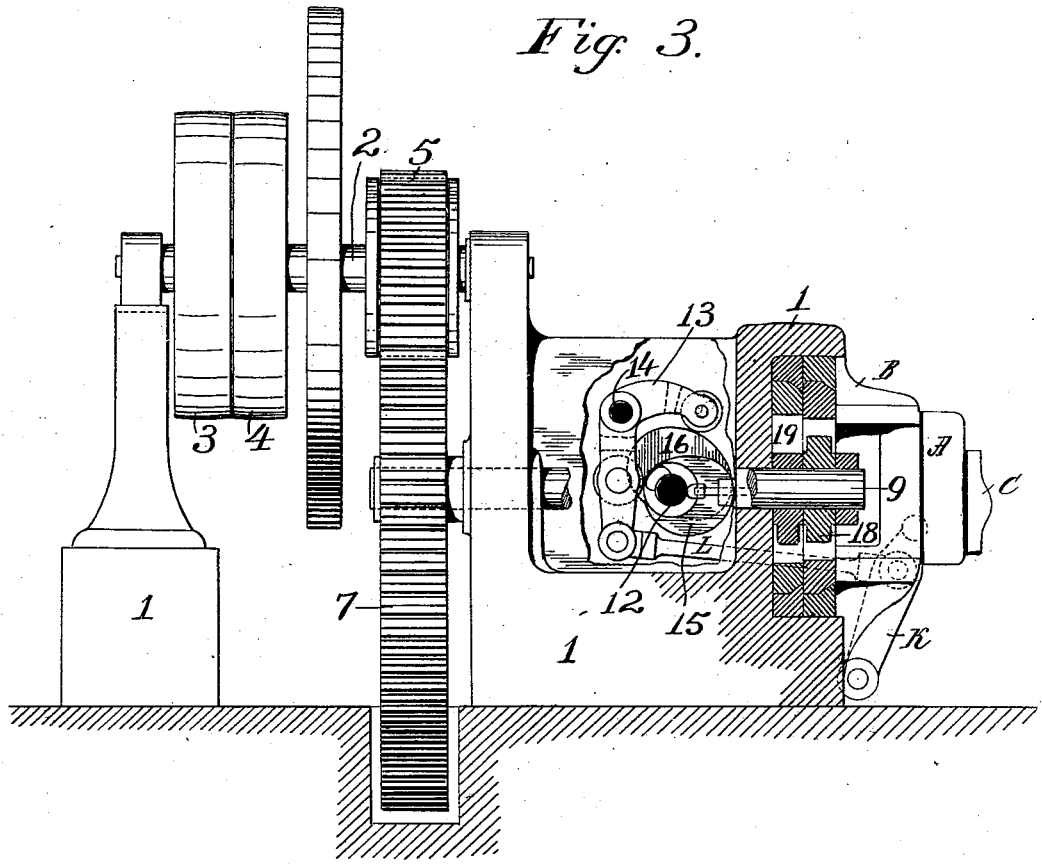
Fig. 3.
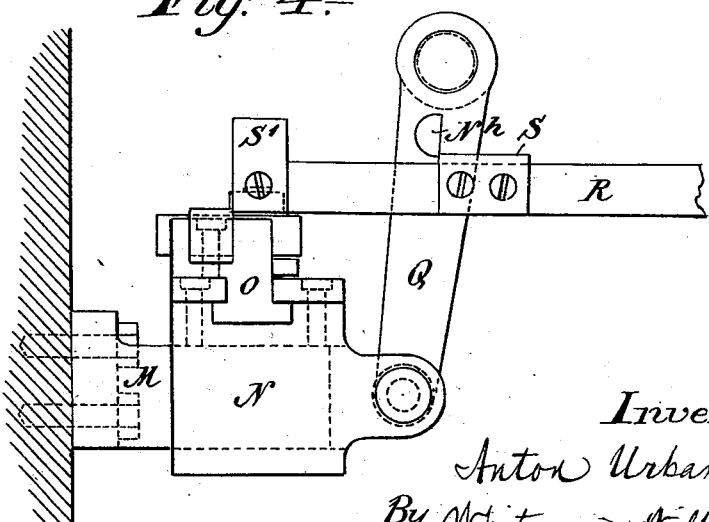
Fig. 4ª
Witnesses:
John C. Wilson
Percy C. Bowen
Inventor:
Anton Urban
By Whitman & Wilkinson
Attorneys.

(No Model.) 7 Sheets—Sheet 6.
A. URBAN.
MACHINE FOR MAKING NUTS.
No. 517,779. Patented Apr. 3, 1894.
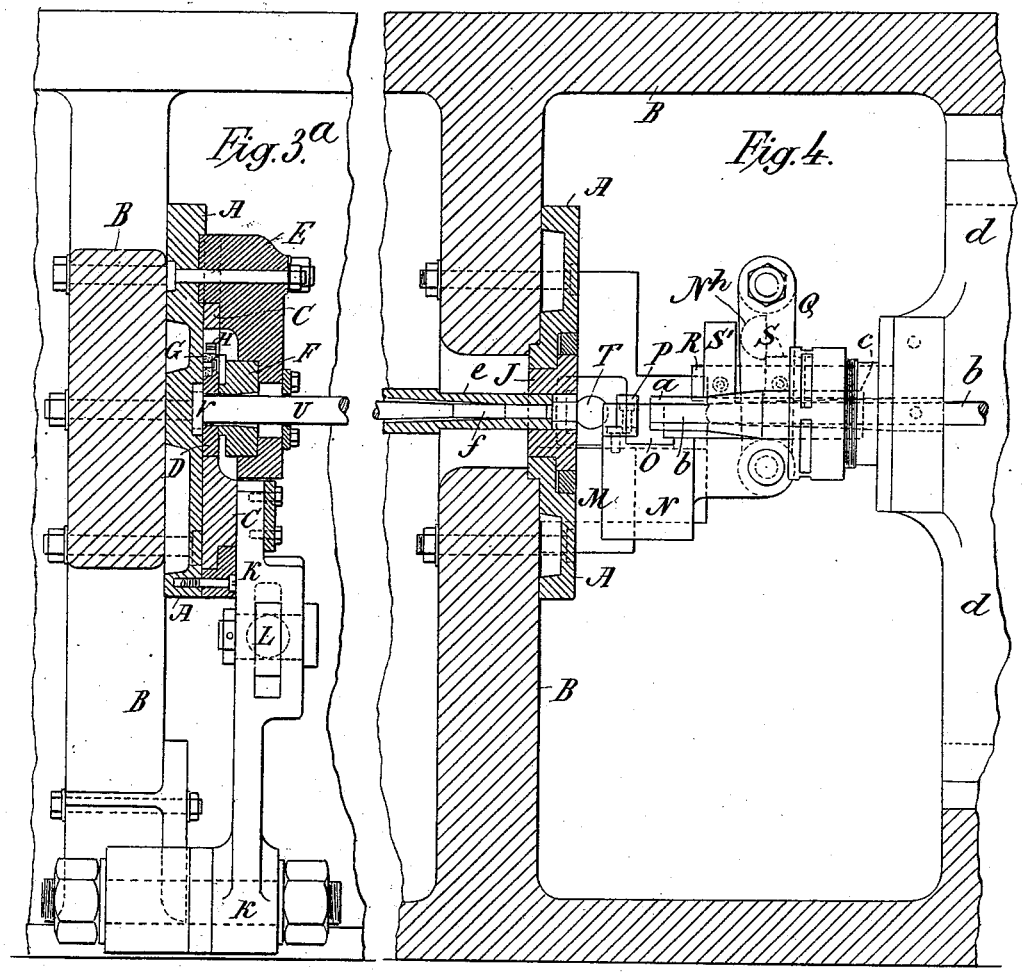
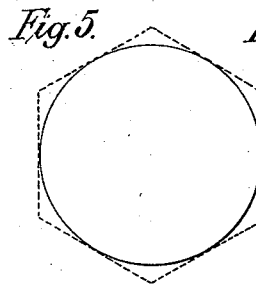
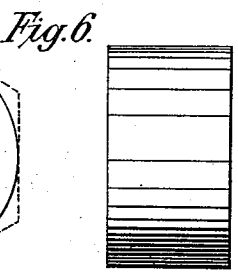
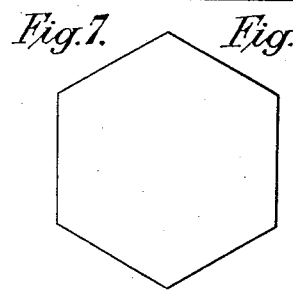
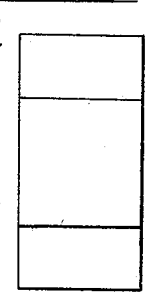
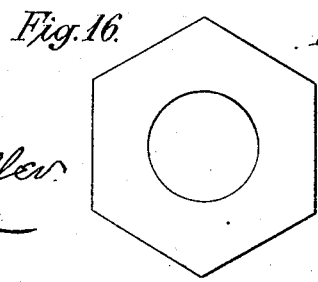
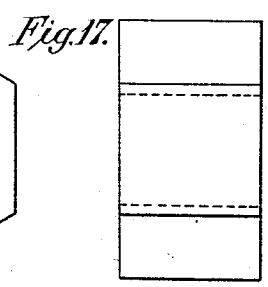
Witnesses.
Louis P. Keller
J. C. Wilson
Inventor.
Anton Urban
by Whitman & Wilkins
Attorneys (No Model.) 7 Sheets—Sheet 7.
A. URBAN.
MACHINE FOR MAKING NUTS.
No. 517,779. Patented Apr. 3, 1894.
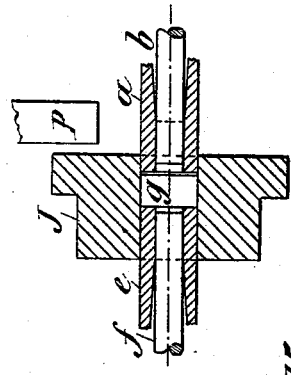
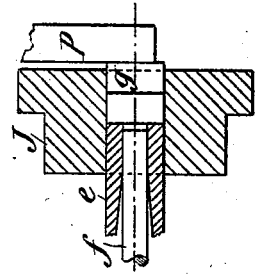
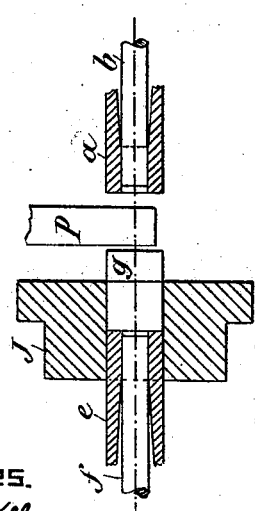
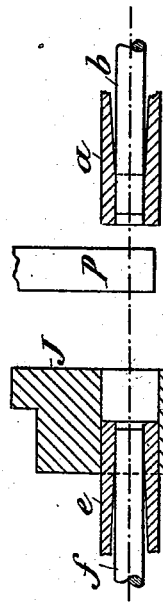
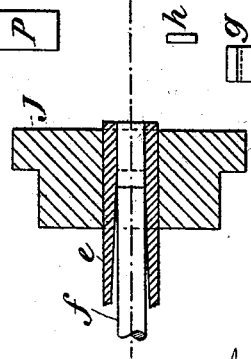
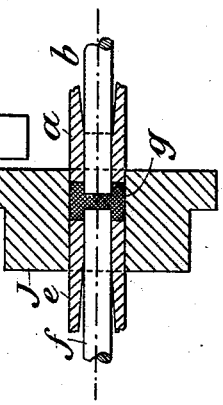
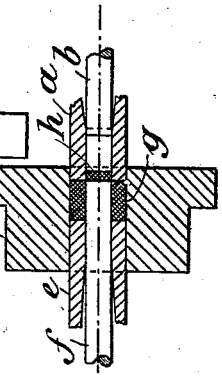
Witnesses.
Louis P. Keller
J. C. Tilson
Inventor:
Anton Urban,
by Whitman & Wilkinson,
Attorneys.

UNITED STATES PATENT OFFICE.

ANTON URBAN, OF VIENNA, AUSTRIA-HUNGARY.

MACHINE FOR MAKING NUTS.

SPECIFICATION forming part of Letters Patent No. 517,779, dated April 3, 1894.

Application filed April 27, 1893. Serial No. 472,090. (No model.)

*To all whom it may concern:*

Be it known that I, ANTON URBAN, a subject of the Emperor of Austria-Hungary, and a resident of the city of Vienna, Austria-Hungary, have invented certain new and useful Improvements in Machines for Making Nuts, of which the following is a specification.

My invention relates to the manufacture of nuts for bolts and to apparatus therefor.

According to the said invention I employ, instead of flat-iron as is customary, rolled round or hexagonal iron rods from which pieces of suitable size are cut in the hot state by means of an apparatus which automatically conducts these pieces to the front of the press matrix and inserts them into the latter. In the matrix the nut is then pressed in the well-known manner to the proper form in a single operation.

Figure 2:
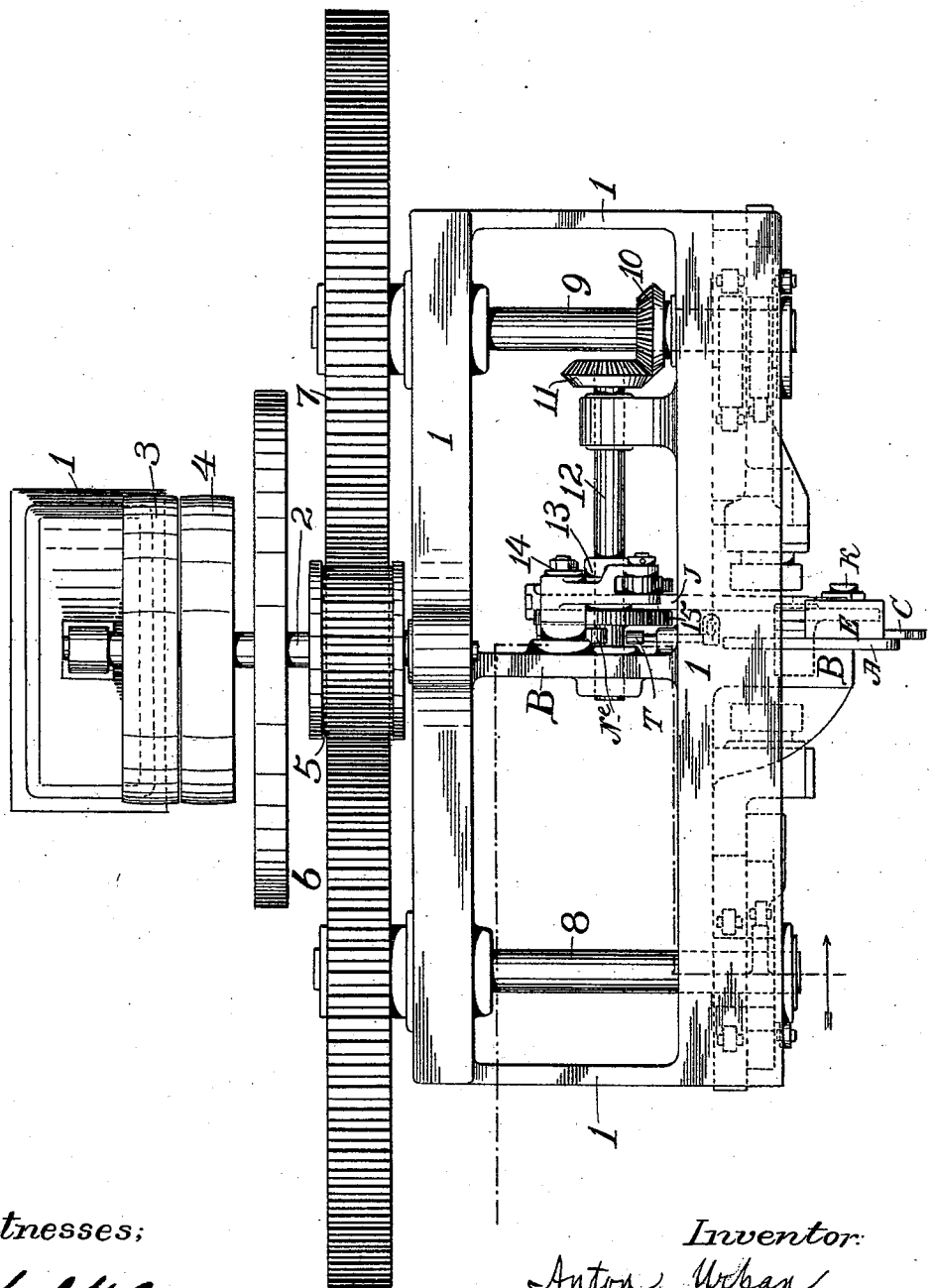

In the accompanying drawings Figure 1 is a front elevation of the machine. Fig. 2 is a plan. Fig. 3 is a side elevation partly in section some of the parts being broken off. Fig. 1$^a$ is a side elevation of the blank cutting and inserting apparatus. Fig. 2$^a$ is a horizontal section on line 2 2 Fig. 1$^a$. Fig. 3$^a$ is a front elevation partly in section on line 3 3 Fig. 2$^a$. Fig. 4 is a front elevation partly in section on line 4 4 Fig. 2$^a$. Figs. 1$^a$, 2$^a$, 3$^a$, and 4 are drawn on a larger scale than Figs. 1, 2, and 3. Figs. 1$^b$ and 2$^b$ show some parts of Figs. 1$^a$ and 2$^a$ respectively on a still larger scale and in a different position, some of the details being slightly modified. Fig. 4$^a$ shows some parts of Fig. 4 on a larger scale with some slight modifications. Figs. 5 and 6 show a blank as cut from a round rod. Figs. 7 and 8 show a blank as cut from a hexagonal rod. Figs. 9 to 15 are diagrams showing the various steps in the manufacture of a nut in accordance with my invention. Figs. 16 and 17 show a finished nut. Fig. 18 represents a side elevation and end view of the spring-operated finger for holding the blank after it has been cut off from the rod or bar.

In Figs. 1 to 3; 1 is the main frame; 2 is a shaft mounted in bearings therein; 3, 4 are fast and loose pulleys thereon; 5 is a pinion on shaft 2 meshing with spur wheels 6 7 on shafts 8, 9 respectively. On the shaft 9$^a$ a bevel wheel 10 is keyed which meshes with a bevel wheel 11 on a shaft 12. Cams on the shafts 8, 9 and 12 impart the required motion to the working parts of the machine as hereinafter described.

To a projecting breast part B of the main frame 1 of the machine I secure a tool plate A on which the cutter slide C is supported in two prismatic guides. This slide carries the cutter D clamped by means of screws. This cutter serves to cut the blank from the rod U as shown in Figs. 2$^a$ and 3$^a$ such blank being marked by the letter $g$ in Figs. 9 to 14. The height of this blank depends on the size of the nut to be made hence for each size of nut a separate cutter D has to be employed. In an overhanging part E is fixed the stationary counter cutter F necessary for cutting the round or hexagonal iron rod, and which can be accurately adjusted to the proper distance from the tool plate A to the height of the nut. In connection with the the said cutter D, I provide a one armed lever or finger G, Fig. 1$^a$, which by the aid of a flat spring H is pressed against the piece cut off and in this manner prevents it from being displaced or turned over. The finger G is pivoted as at $g^3$ in Fig. 18, and carries a projecting arm $g^2$ which is borne on by the spring H. By the movement of the slide C together with the cutter D in the direction of the arrow Fig. 1 through the distance $m$ Fig. 2$^a$ the blank $g$ now severed from the rod is placed in front of the hexagonal opening in the matrix J. In this position the slide remains until the action of the inserting device secured to the rear of the breast B has been terminated.

The slide C with the cutter D is moved by a lever K (Figs. 1, 2, 3, 1$^a$, 2$^a$, and 3$^a$), connected by a link L with one end of a bell crank lever 13 journaled at 14 in the main frame of the machine (Figs. 2 and 3). Rollers on the two arms of this bell crank lever ride on cams 15, 16 on the shaft 12. These cams are so shaped that cam 15 moves the slide C forward to cut off the blank and bring it in front of the matrix J, whereupon the slide remains stationary for some time and then is moved backward by the cam 16 into its original position shown in Figs. 1$^a$ and 2$^a$. In the latter position this slide again remains stationary for some time during which the rod U is pushed forward by the attendant so that a fresh blank may be cut off therefrom when the slide C is again moved forward as described.

For inserting the blank into the matrix J after it has been cut off and brought in front thereof by the slide C and cutter D I employ the inserting device. This device comprises a slide N which is arranged to be displaced in a direction perpendicularly to the tool plate A on a guide stud M fast in the main frame; in this slide N is supported a transverse slide O to which the inserting rod D is secured. By the forward movement of the stamp slide $d$ Fig. 4 on the right hand side a rod R attached thereto is moved in the same direction that is to say to the left. A tappet S fixed to this rod R strikes against a projection $N^h$ on the lever Q Figs. $1^a$, 4, and $4^a$ thereby moving the slide N of the inserting device against the tool plate. Thus the inserting rod will push the blank which is in front of the matrix into the latter while the slide O is stationary on slide N. The projection $N^h$ and the tappet S are so shaped that when the blank has been inserted into the matrix, they come out of engagement with each other because the projection $N^h$ is raised a little when the lever Q is turned. The tappet S then passes freely beneath the projection $N^h$ as the stamp slide continues its forward movement. The transverse slide O together with the inserting rod P is moved forward parallel to the tool plate A by a rod T acted upon by a cam $N^c$ on the shaft 12 Figs. $1^b$, 2, and 3 to bring the circular head of the rod P in front of the matrix J Fig. $1^b$; while in this position the slide N is moved forward as above described to insert the blank into the matrice. When this is one the cam $N^c$ leaves the rod T which is then drawn back together with the slide O and rod P by a spring 17 Fig. $1^b$. In retiring the rounded head of the rod P must leave the mouth of the cutter D into which it had previously entered; this is permitted by the yielding finger G. While the rod P is thus drawn back to such an extent that the stamp on the right hand side can move forward, the slide C is caused by the cam 16 as set forth to move so that the cutter D returns to its original position. In the backward movement of the slide the lever or finger G is raised a little by the aid of a projecting nose on the same, engaging with an incline on the frame in order that the rod U may be easily inserted for the purpose of cutting off a fresh blank. By means of a second tappet S' on the above mentioned rod R; and in the return movement of the slide $d$ of the right hand side stamp $a$ the lever Q is caused to move in the same direction, thereby bringing the slide N together with the slide O and the inserting rod P so that all these parts assume their original position.

For pressing the blank to the proper shape I use in the well known manner the right hand stamp $a$ which is clamped in a holder $c$ secured upon the stamp slide $d$ on the right hand side; a punch $b$ on the right hand side for the preliminary punching, which is arranged so as to be easily adjustable by means of small plates in the punch slide; a stamp or die $e$ on the left hand side, which is arranged so that it may be adjusted in a holder attached to the stamp slide on the left; and a punch $f$ for the finishing operation which is provided on the left hand side and is likewise clamped in an easily adjustable holder of the punch slide on the left hand side. The tool-slides upon which the aforesaid tools are clamped are guided in a straight line in prismatic guides in the well-known manner, and a suitable to-and-fro motion is imparted to them by means of rotary eccentrics or cams, as shown in Figs. 1 and 2. The cams 18 and 19 for the die $e$ and the punch $f$ are keyed on shaft 8 and the cams 20 and 21 are keyed on shaft 9.

The operations in pressing nuts according to the present process are illustrated by the diagrams Figs. 9 to 15. According to my improved process I proceed as follows that is to say, a round iron rod U Figs. $2^a$ and $3^a$ or a rod rolled to the form of a hexagon is pushed by the workman through the opening of the counter cutter F. The cutter slide C with the cutter D being caused to move in the direction of the arrow cuts from the said rod U a blank $g$ Fig. 9 of suitable height and conducts it to the front of the hexagonal opening of the matrix J. Figs. 5 and 6 show a round blank cut off the rod and Figs. 7 and 8 a hexagonal blank both in full size. As soon as the blank has passed to the front of the matrix the cutter slide C stops for a moment and the inserting device commences to act Fig. 9. When the blank has been inserted far enough into the matrix by the inserting rod P as indicated in Fig. 10 the latter and the cutter slide C together with the cutter move away from the matrix, in order that the stamp $a$ on the right hand side may in its forward movement introduce the blank $g$ quite into the matrix Fig. 11. The stamp $a$ on the right now stops while the two punches $b$ and $f$ on the right and left hand side are caused to pass into the material Fig. 12. By the pressure of the punch and stamp the blank inserted into the matrix is pressed to the exact form of a nut. As the punch $b$ on the right hand side moves rapidly backward the punch $f$ on the left hand side follows the same and completely perforates the nut, the burr $h$ being driven into the stamp $a$ Fig. 13.

The further operation have more particularly for their object to push out the nut and the burr. The stamp on the left hand side, which remains at the same place during the whole of the above-described operation is now caused to move forward after the punch on the right hand side has been moved away from the nut and pushes the finished nut from the matrix as shown in Fig. 14. At the same time the punch $f$ on the left hand side returns to its original position, and the punch b on the right hand side, in the backward movement of the stamp a ejects the burr or piece which has been punched out from the nut. As the stamp slide on the right hand side moves back it effects the backward movement of the inserting rod by means of the before described lever mechanism Q. Fig. 15 shows the parts in their original position. During the backward movement of the stamps and punches to their original position a piece is cut from the rod U in the well-known manner, in order to be conducted to the front of the matrix and to be converted into a nut shown in Figs. 16 and 17 in the manner herein set forth. Thus the nut is made of the blank without any loss of material except the small burr h; besides the nuts thus made show a smooth finished surface and are quite regular and exact in shape.

Having thus described my invention, what I claim, and desire to secure by Letters Patent of the United States, is—

1. In a machine for making nuts, the combination with a matrix of the form of the desired exterior of the nut; of means for cutting off the blank and carrying it in front of the matrix; an inserting rod adapted to press said blank into said matrix and then to move out of the way; two hollow stamps adapted to enter said matrix and press against the exterior edges of the blank; and cylindrical punches moving in said hollow stamps and adapted to press part of the material forming the blank away from the center and toward the circumference of said blank, and then to punch out the burr remaining in the said center, substantially as described.

2. In a machine for making nuts, the combination with a matrix of the form of the desired exterior of the nut; of means for cutting off the blank, carrying it in front of said matrix; an inserting rod adapted to press said blank into said matrix, and means for intermittently moving said rod toward said matrix and removing it clear of the same; two hollow stamps adapted to enter said matrix from opposite sides and to compress the exterior edges of said blank; a cylindrical punch mounted in each of said hollow stamps; and means for moving said punches independently of said hollow stamps, substantially as described.

3. In a machine for making nuts, the combination with a matrix, of the form of the desired exterior of the nut; of means for cutting off the blank, holding the same in position and carrying it in front of said matrix; an inserting rod and means for operating the same for inserting said blank in said matrix; two hollow stamps adapted to enter said matrix and press against the exterior edges of the blank; and cylindrical punches moving in said hollow stamps and adapted to press part of the material forming the blank away from the center and toward the circumference of said blank, and then to punch out the burr remaining in the said center, substantially as described.

4. In a machine for making nuts, the combination with a matrix of the form of the desired exterior of the nut; of a fixed and movable cutter for cutting off said blank, and a spring operated finger for holding said blank after it has been cut off; means for carrying it to and inserting it in said matrix; two hollow stamps adapted to enter said matrix from opposite sides and to compress the exterior edges of said blanks; a cylindrical punch mounted in each of said hollow stamps; and means for moving said punches independently of said hollow stamps, substantially as described.

5. In a machine for making nuts, the combination with a matrix of the form of the desired exterior of the nut; of a fixed and movable cutter for cutting off said blank, and a spring operated finger for holding said blank after it has been cut off; means for carrying it to and inserting it in said matrix; two hollow stamps adapted to enter said matrix from opposite sides and to compress the exterior edges of said blank; cams and mechanism for operating the same for moving said stamps; a cylindrical punch moving in each of said hollow stamps; and cams and mechanism for operating the same for moving said punches independently of said stamps, substantially as and for the purposes described.

In testimony whereof I have affixed my signature in presence of two witnesses.

ANTON URBAN.

Witnesses:
JOHN GEORGE HARDY,
A. SCHLESSING.